(12) United States Patent
Huang

(10) Patent No.: US 7,226,256 B2
(45) Date of Patent: Jun. 5, 2007

(54) MACHINE TOOL HAVING INBUILT WATER SUPPLIER

(76) Inventor: Chin Piao Huang, No. 40, Chisin Road, Baidon Li, Tonsiao Town, Miauli Hsien 35742 (TW)

( * ) Notice: Subject to any disclaimer, the term of this patent is extended or adjusted under 35 U.S.C. 154(b) by 0 days.

(21) Appl. No.: 11/190,558

(22) Filed: Jul. 28, 2005

(65) Prior Publication Data

US 2006/0120817 A1 Jun. 8, 2006

(30) Foreign Application Priority Data

Dec. 3, 2004 (TW) .............................. 93137293 A

(51) Int. Cl.
*B23Q 11/10* (2006.01)
(52) U.S. Cl. .................... 409/137; 409/136; 409/233; 408/56
(58) Field of Classification Search ............... 409/131, 409/136, 135, 137, 132, 134, 233, 231, 234, 409/80; 408/57, 59, 56, 16
See application file for complete search history.

(56) References Cited

U.S. PATENT DOCUMENTS

| 4,784,539 | A | * | 11/1988 | Lehmkuhl ................... 409/80 |
| 4,951,578 | A | * | 8/1990 | von Haas et al. ........... 409/136 |
| 5,290,130 | A | * | 3/1994 | Beretta ....................... 409/131 |
| 5,487,631 | A | * | 1/1996 | Child ......................... 409/231 |
| 5,660,510 | A | * | 8/1997 | Taniguchi et al. .......... 409/136 |
| 5,899,839 | A | | 5/1999 | Xiao ........................... 483/67 |
| 5,967,716 | A | * | 10/1999 | Katsuzawa et al. ......... 409/134 |
| 6,050,756 | A | * | 4/2000 | Buchholz et al. .......... 409/131 |
| 6,264,409 | B1 | * | 7/2001 | Date et al. .................. 409/233 |
| 6,599,066 | B1 | * | 7/2003 | Koike et al. ................ 409/135 |
| 6,644,900 | B1 | * | 11/2003 | Sugata et al. ............... 409/136 |
| 6,692,202 | B2 | * | 2/2004 | Katsuzawa et al. ......... 409/135 |
| 6,729,813 | B2 | * | 5/2004 | Sahm et al. ................ 409/136 |
| 2002/0176758 | A1 | * | 11/2002 | Sahm et al. ................ 409/231 |

* cited by examiner

*Primary Examiner*—Dana Ross
(74) *Attorney, Agent, or Firm*—Charles E. Baxley

(57) ABSTRACT

A machine tool includes a base having a spindle rotatably attached to a support for supporting a tool member, and a fluid supplying device for supplying fluid into the spindle, for cooling purposes. The fluid supplying device includes a housing secured to the support for rotatably receiving the spindle, a casing is secured to the housing and has a channel for communicating with the conduit of the housing, and a membrane is secured between the housing and the casing and disposed between the bore of the housing and a space of the casing for pumping the fluid from the space to the channel of the casing. A check valve is disposed in the casing and has a spring member for biasing a ball to selectively block or open a passage of the casing.

14 Claims, 7 Drawing Sheets

MACHINE TOOL HAVING INBUILT WATER SUPPLIER

BACKGROUND OF THE INVENTION

1. Field of the Invention

The present invention relates to a machine tool, and more particularly to a machine tool having a water supplier device disposed or built or provided therein, for supplying water to remove cut chips or to clean the machine tool.

2. Description of the Prior Art

Typical machines or machine tools, such as drilling machines, milling machines, or other power machines may comprise a spindle rotated in a high speed, and a tool member attached onto the spindle, for being rotated or driven by the spindle to conduct various cutting, drilling, or other machining operations.

Due to the high rotating speed of the spindle and the tool member, a great heat may be generated on the objects or workpieces onto which the tool member is acted or worked, such that a cooling water is required to be supplied to the tool member or the objects or the workpieces, in order to cool the tool member and the objects or the workpieces.

For example, U.S. Pat. No. 5,899,839 to Xiao discloses one of the typical machines or machine tools also comprising a spindle rotated in a high rotational speed, and a cooling water is supplied to the tool member or the objects or the workpieces with one or more pipes, in order to cool the tool member and the objects or the workpieces.

However, a large amount of hoses or water pipes are required to be attached onto the typical machines or machine tools, and may increase the volume and the complication and thus the manufacturing cost of the typical machines or machine tools. In addition, the water supplying hoses or water pipes may be extended or disposed beside the tool members, and may affect the operations of the typical machines or machine tools by the workers.

The present invention has arisen to mitigate and/or obviate the afore-described disadvantages of the conventional machines or machine tools.

SUMMARY OF THE INVENTION

The primary objective of the present invention is to provide a machine tool including a water supplier device disposed or built or provided therein, for supplying water to remove cut chips or to clean the machine tool, without additional or outer or further water supplier device.

In accordance with one aspect of the invention, there is provided a machine tool comprising a base including a support disposed thereon, a spindle rotatably attached to the support for supporting a tool member thereon, and including a pathway formed therein, and including a port formed therein and communicating with the pathway thereof, and a fluid supplying device for supplying fluid into the pathway via the port of the spindle, for cooling purposes.

The fluid supplying device includes a housing secured to the support, and having a bore formed therein for rotatably receiving the spindle, and having a conduit formed therein for selectively aligning with the port of the spindle, and for allowing the fluid from the fluid supplying device to selectively flow into the port of the spindle.

The housing includes an annular swelling extended into the bore thereof, and includes the conduit formed in the annular swelling of the housing. The housing includes a gasket disposed therein and engaged in the annular swelling, and having an opening formed therein and aligned with the conduit of the housing.

The fluid supplying device includes a casing secured to the housing and having a channel and a space formed therein, and the channel of the casing is communicating with the conduit of the housing, and a membrane is secured between the housing and the casing and disposed between the bore of the housing and the space of the casing for pumping the fluid from the space to the channel of the casing.

The casing includes a partition provided therein to separate the space and the channel thereof from each other, and having at least one passage formed in the partition, for communicating the channel and the space thereof with each other.

The casing includes a check valve having a spring member for biasing a ball to engage with and to selectively block or open the passage of the casing. The check valve includes a fastener threaded to the casing, for engaging with and for retaining the spring member and the ball within the casing.

The membrane includes a passageway formed therein and disposed between the conduit of the housing and the channel of the casing, to allow the fluid to flow form the channel of the casing into the conduit of the housing. The fluid supplying device includes a cam member secured onto the spindle and rotated in concert with the spindle, and having a cam outer peripheral surface formed thereon, for actuating the membrane to pump the fluid.

The cam member includes a bearing engaged onto the cam outer peripheral surface thereof, for actuating the membrane to pump the fluid. The fluid supplying device includes a spring member disposed in the space of the casing and engaged with the membrane, for biasing the membrane toward the cam member. The spring member includes a head and a seat attached to two ends thereof respectively, for positioning the spring member.

The fluid supplying device includes a block secured to the casing and having a chamber formed therein, and having an outlet and an inlet formed therein and communicating with the chamber thereof, and having a valve seat provided therein, and located between the chamber and the outlet thereof, and a check valve having a spring member engaged with a ball, for biasing the ball to engage with and to selectively block or open the valve seat of the block.

The block includes an extension extended therefrom and having the inlet formed therein, and a coupler engaged onto the extension of the block and having a cavity formed therein, for aligning with and for communicating with the inlet of the block, and having a mouth provided therein, for coupling to a fluid reservoir with a hose. The block includes at least one sealing ring engaged between the extension and the coupler.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
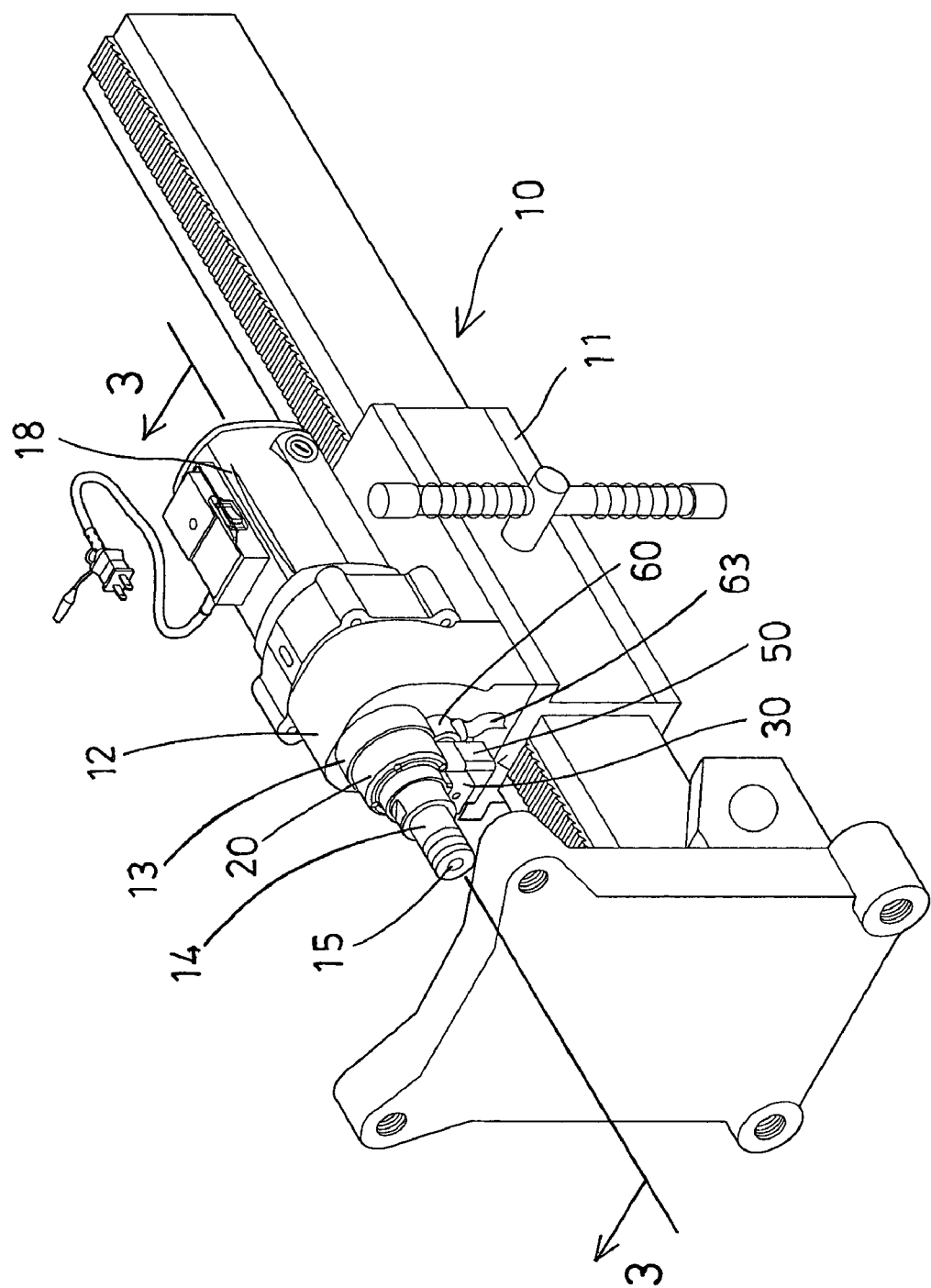
FIG. 1 is a partial perspective view of a machine tool in accordance with the present invention.
Figure 2:
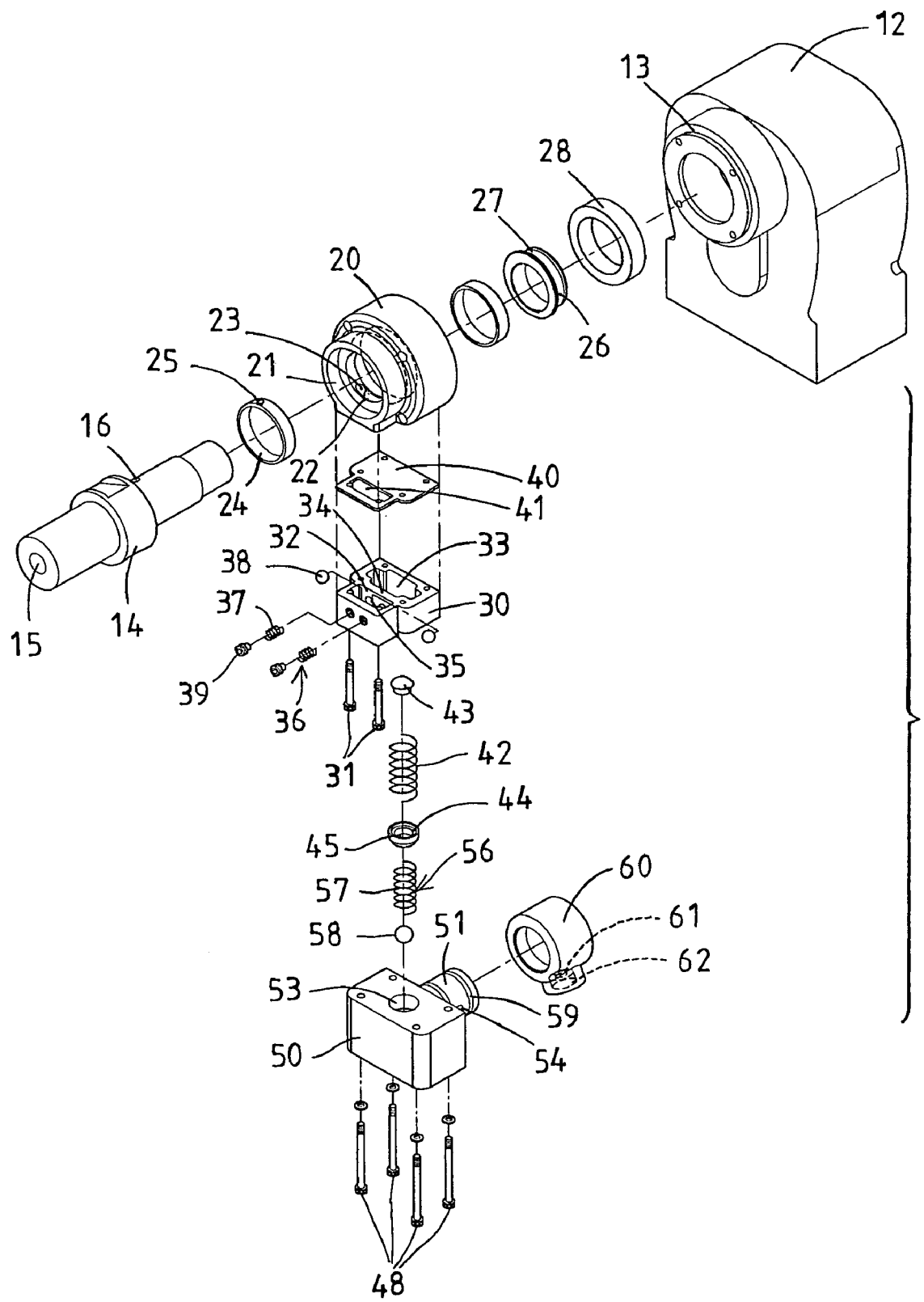
FIG. 2 is a partial exploded view of the machine tool.
Figure 3:
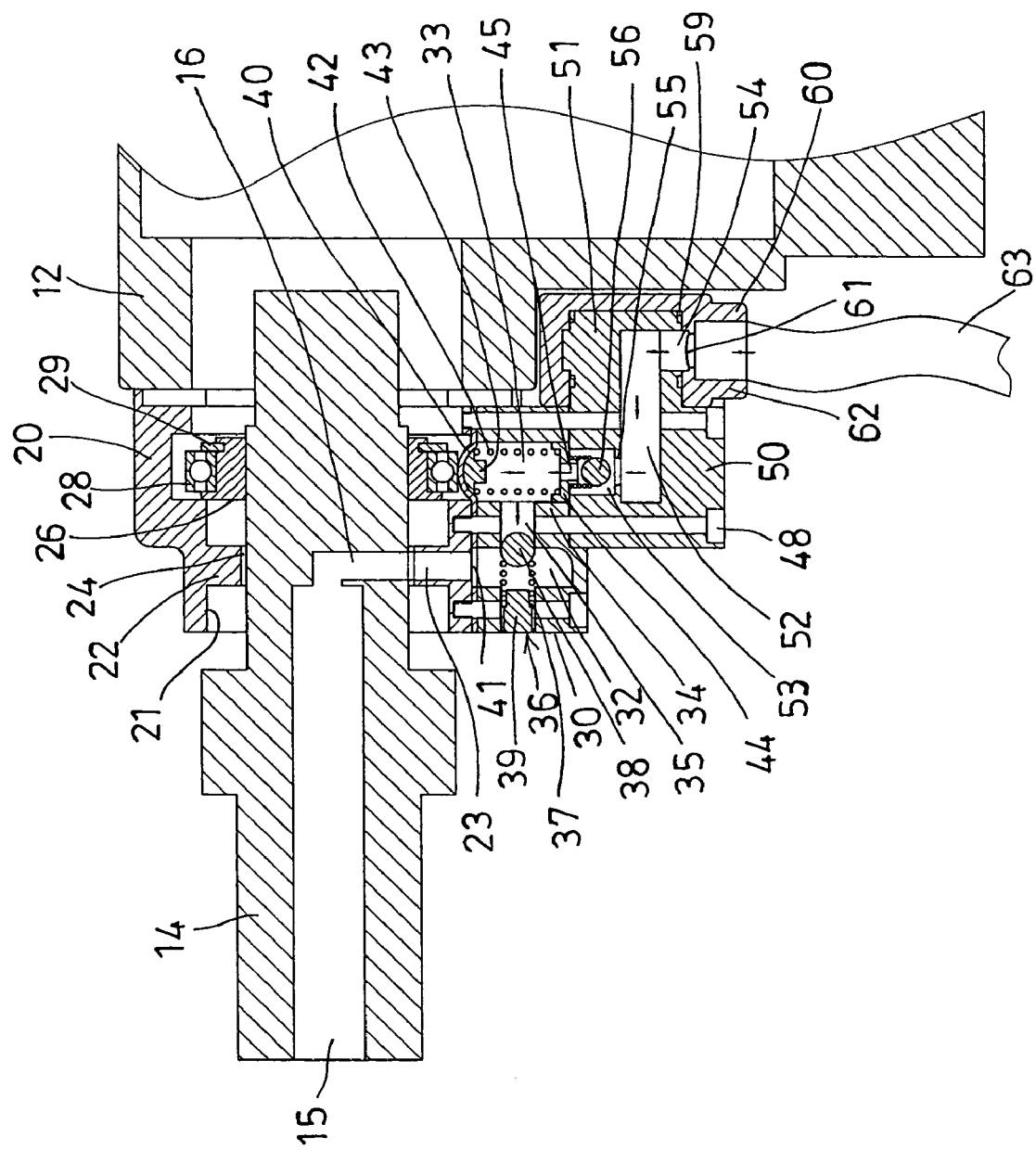
FIG. 3 is a partial cross sectional view taken along lines 3—3 of FIG. 1.

Referring to the drawings, and initially to FIGS. 1–3, a machine tool 10 in accordance with the present invention comprises a base 11 including a support 12 disposed thereon, and a housing 20 secured to a front portion 13 of the support 12 with such as fasteners (not shown). The housing 20 includes a bore 21 formed therein, an annular swelling 22 extended into the bore 21 of the housing 20, and a conduit 23 formed in the housing 20, such as formed in the annular swelling 22 of the housing 20.

Figure 4:
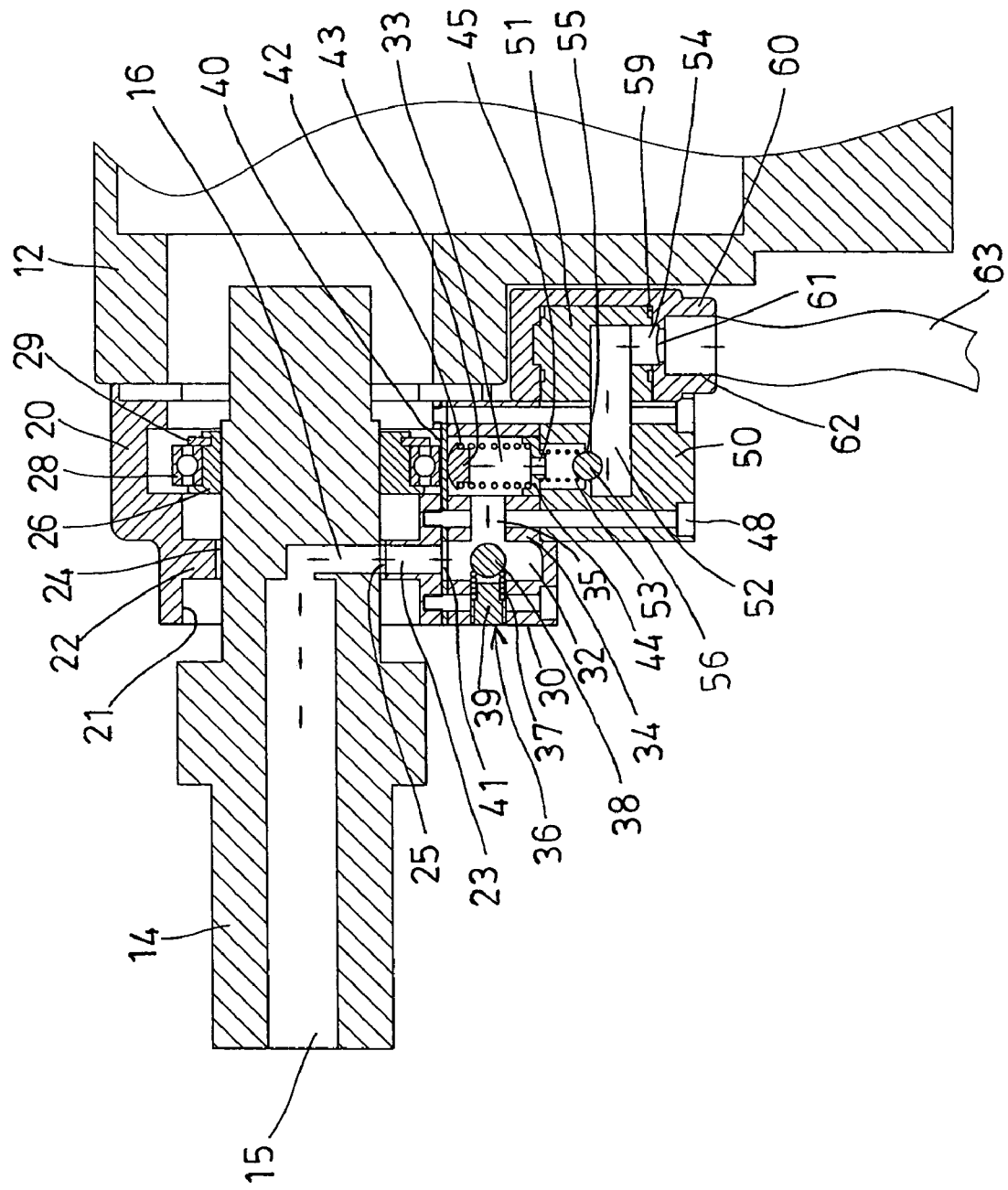
FIG. 4 is a partial cross sectional view similar to FIG. 3, illustrating the operation of the machine tool.

A sealing ring or a gasket 24 is disposed in the housing 20, such as engaged in the annular swelling 22, and has an opening 25 formed therein and aligned with the conduit 23 of the housing 20. A spindle 14 is rotatably received in and attached to the housing 20 with the gasket 24, and/or partially extended into or attached to the support 12, and includes a pathway 15 formed therein, and a port 16 communicating with the pathway 15 thereof, for selectively communicating with the opening 25 of the gasket 24 and the conduit 23 of the housing 20 (FIGS. 3, 4).

An eccentric member or a cam member 26 is secured onto the spindle 14 and rotated in concert with the spindle 14, and includes an eccentric or cam outer peripheral surface 27 formed thereon. A bearing 28 may be optionally or selectively attached or secured onto the eccentric or cam outer peripheral surface 27 of the eccentric member or cam member 26, and may be solidly secured onto the eccentric member or cam member 26 with such as a retaining ring 29 (FIGS. 3, 4), or the like.

As shown in FIG. 1, a conventional driving device 18, such as a motor driving device 18 may be attached or secured to the support 12, and may be coupled to the spindle 14, and one or more tool members (not shown) may be attached or secured onto the spindle 14, for allowing the spindle 14 and the tool members to be rotated or driven by the conventional driving device 18 to conduct various machining operations. The driving device 18 is not related to the present invention and will not be described in further details.

A casing 30 may be attached or secured to the bottom of the housing 20 with such as fasteners 31, and includes a channel 32 and a space 33 formed therein, and separated from each other by such as a partition 34, and includes one or more passages 35 formed in the partition 34, for communicating the channel 32 and the space 33 thereof with each other, and one or more check valves 36 for selectively blocking or opening the passages 35 thereof.

For example, each of the check valves 36 includes a spring member 37 for biasing a ball 38 to engage with or to block or to open the passages 35 of the casing 30, and a fastener 39 threaded to the casing 30, for engaging with and for retaining the spring member 37 and the ball 38 within the casing 30. The check valves 36 are arranged to allow water or fluid to flow from the space 33 to the channel 32 of the casing 30 only, and to prevent the water or fluid to flow backwardly from the channel 32 to the space 33 of the casing 30, best shown in FIGS. 3 and 4.

A blade or film or membrane 40 is secured between the housing 20 and the casing 30, and is disposed between the bore 21 of the housing 20 and the space 33 of the casing 30, to block and to prevent the water or fluid from flowing between the bore 21 of the housing 20 and the space 33 of the casing 30. The membrane 40 includes a passageway 41 formed therein and disposed between the conduit 23 of the housing 20 and the channel 32 of the casing 30, to allow the water or fluid to flow form the channel 32 of the casing 30 through or into the conduit 23 of the housing 20.

A spring member 42 is disposed in the space 33 of the casing 30, and engaged with the membrane 40, for biasing the membrane 40 toward and to engage with the cam member 26 and/or the bearing 28, to allow the membrane 40 to be moved or forced or depressed by the cam member 26 and/or the bearing 28. A head 43 may be engaged on one end or upper end of the spring member 42, and may be engaged with or secured to the membrane 40, for positioning the spring member 42 to the membrane 40. A seat 44 may be engaged on the other or lower end of the spring member 42, and may be engaged with or secured to the casing 30, for positioning the spring member 42 to the casing 30.

A block 50 may be secured to the bottom of the casing 30 with such as fasteners 48, and includes an extension 51 extended therefrom, and includes a chamber 52 formed therein, and includes an outlet 53 and an inlet 54 formed therein and communicating with the chamber 52 thereof, and includes a valve seat 55 formed or provided therein, and located between the chamber 52 and the outlet 53 thereof, for engaging with another check valve 56. The seat 44 includes an aperture 45 formed therein, for allowing the water or fluid to flow from the outlet 53 of the block to the space 33 of the casing 30.

The check valve 56 also includes a spring member 57 for engaging with and for biasing a ball 58 to engage with or to block or to open the valve seat 55 of the block 50, in order to control the fluid or water to flow between the block 50 and the casing 30, and to allow the water or fluid to flow from the chamber 52 to the outlet 53 of the block 50 and thus to the space 33 of the casing 30 only, and to prevent the water or fluid to flow backwardly from the space 33 of the casing 30 to the outlet 53 and the chamber 52 of the block 50, also best shown in FIGS. 3 and 4.

A ring or coupler 60 is attached or engaged onto the extension 51 of the block 50 with one or more sealing rings or gaskets 59, and includes a cavity 61 formed therein, for aligning with and for communicating with the inlet 54 of the block 50, and includes a mouth 62 formed or provided therein, for coupling to a hose 63 which may be coupled to a water or fluid reservoir, for allowing the water or fluid to flow from the coupler 60 into the inlet 54 and the chamber 52 of the block 50, and thus to selectively flow into the pathway 15 of the spindle 14, for cleaning and/or for cooling the spindle 14 and/or the tool members (not shown) and/or the workpieces.

In operation, as shown in FIG. 3, when the water or fluid is supplied from the hose 63 to the coupler 60 and then into the chamber 52 of the block 50, the water or fluid may force the ball 58 against the spring member 57 of the check valve 56 and away from the valve seat 55 of the block 50, to allow the water or fluid to flow into the space 33 of the casing 30, and then to force the balls 38 against the spring members 37 of the check valves 36 and away from the passages 35 of the casing 30, to allow the water or fluid to flow into the channel 32 of the casing 30, and then to flow into the pathway 15 of the spindle 14, for cleaning and/or for cooling the spindle 14 and/or the tool members (not shown) and/or the workpieces.

Alternatively, as shown in FIGS. 3 and 4, when the spindle 14 and the tool members are rotated or driven by the driving device 18 to conduct various machining operations, the cam member 26 and/or the bearing 28 may be engaged with the membrane 40, to move or force or depress the membrane 40 against the spring member 42, in order to pump the water or fluid into the space 33 of the casing 30, and then to pump the water or fluid out of the space 33 of the casing 30.

For example, as shown in FIG. 3, when the spindle 14 and the tool members are rotated or driven by the driving device 18 and when the eccentric or cam outer peripheral surface 27 of the cam member 26 and/or the bearing 28 is moved away from or releases the membrane 40, the membrane 40 may be biased or forced by the spring member 42 to enlarge the volume of the space 33 of the casing 30, and to draw the water or fluid to flow from the chamber 52 of the block 50 into the space 33 of the casing 30, and simultaneously to force the check valves 36 to block the passages 35 of the casing 30.

On the contrary, when the eccentric or cam outer peripheral surface 27 of the cam member 26 and/or the bearing 28 is moved toward or to depress or force against the membrane 40, the membrane 40 may be biased or forced into the space 33 of the casing 30 against the spring member 42, in order to reduce the volume of the space 33 of the casing 30, and to force the check valve 56 to block the valve seat 55 of the block 50, and to prevent the water or fluid to flow backwardly from the space 33 of the casing 30 to the chamber 52 of the block 50.

Simultaneously, the membrane 40 may bias or force the water or fluid to flow from the space 33 of the casing 30 into the channel 32 of the casing 30, against the spring members 37 of the check valves 36 and away from the passages 35 of the casing 30, and then to allow the water or fluid to flow into the pathway 15 of the spindle 14, for cleaning and/or for cooling the spindle 14 and/or the tool members (not shown) and/or the workpieces.

It is to be noted that the eccentric or cam outer peripheral surface 27 of the eccentric member or cam member 26 may be arranged to allow the port 16 of the spindle 14 to be aligned with the opening 25 of the gasket 24 and/or the conduit 23 of the housing 20 when the eccentric member or cam member 26 forces the membrane 40 to force or to pump the water or fluid, as shown in FIG. 4, to allow the water or fluid to flow from the conduit 23 of the housing 20 into the port 16 of the spindle 14 when the membrane 40 is forcing or pumping the water or fluid.

Figure 5:
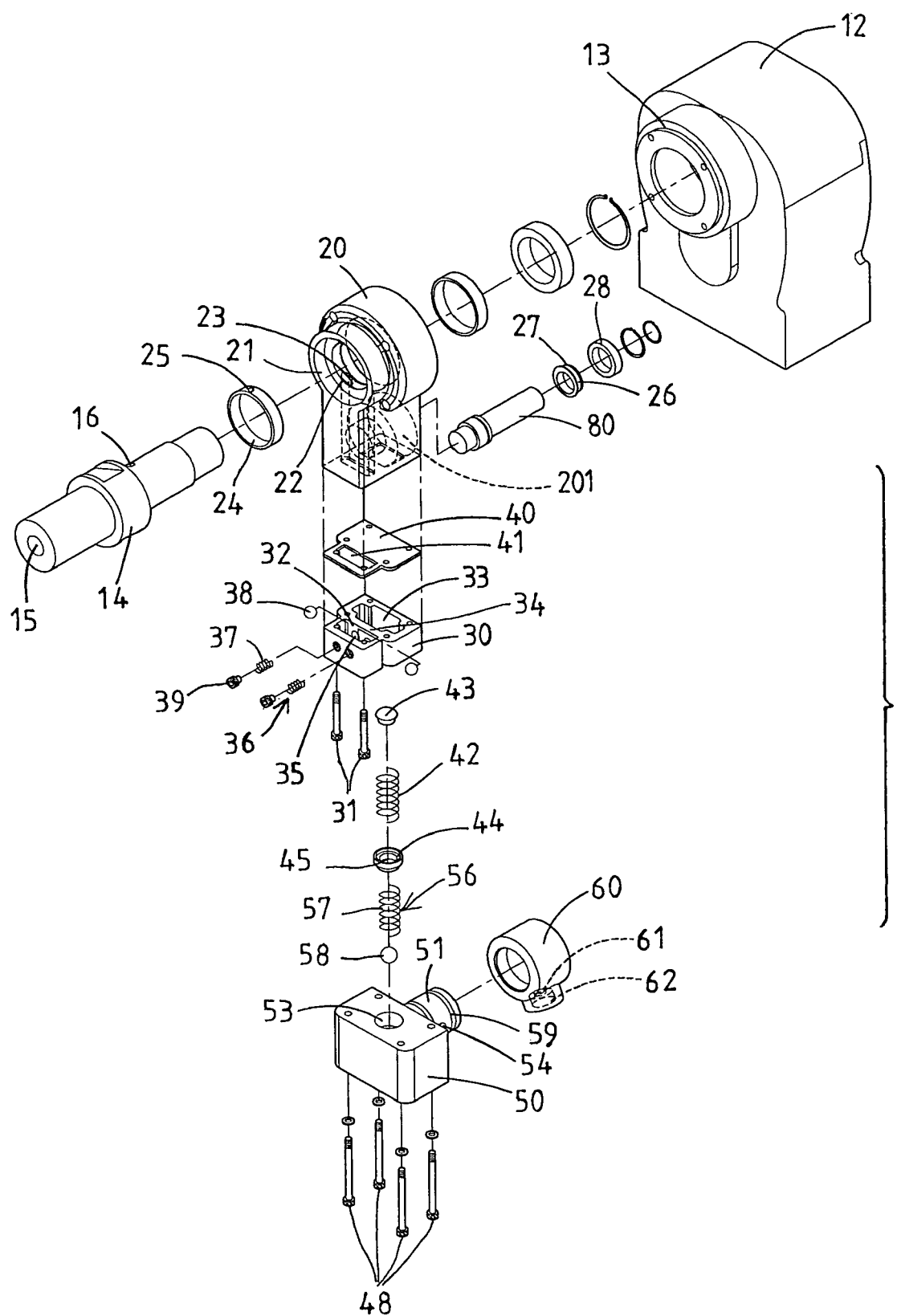
FIG. 5 is a partial exploded view similar to FIG. 2, illustrating the other arrangement of the machine tool.
Figure 6:
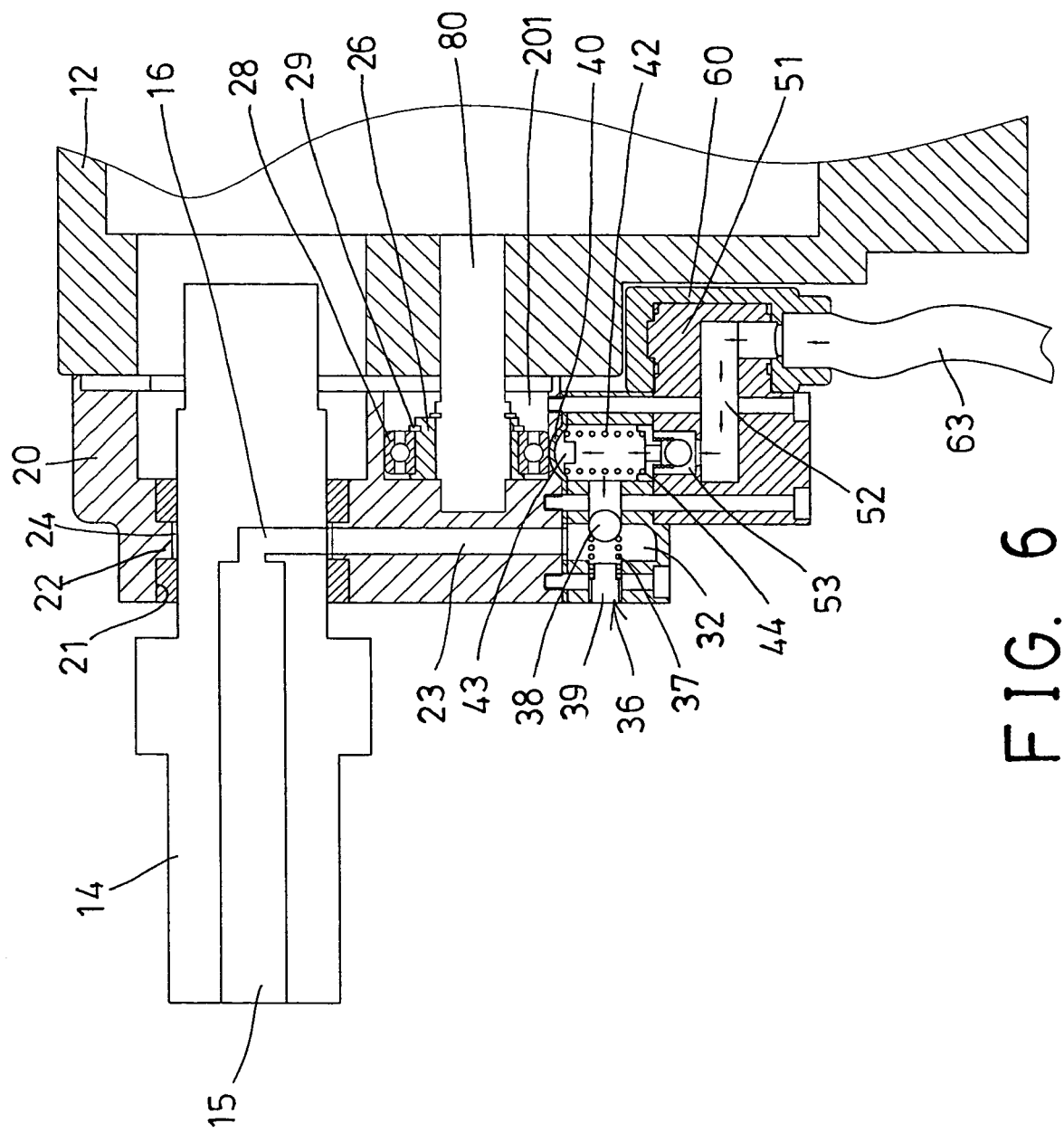
FIGS. 6, 7 are partial cross sectional views of the machine tool as shown in FIG. 5.
Figure 7:
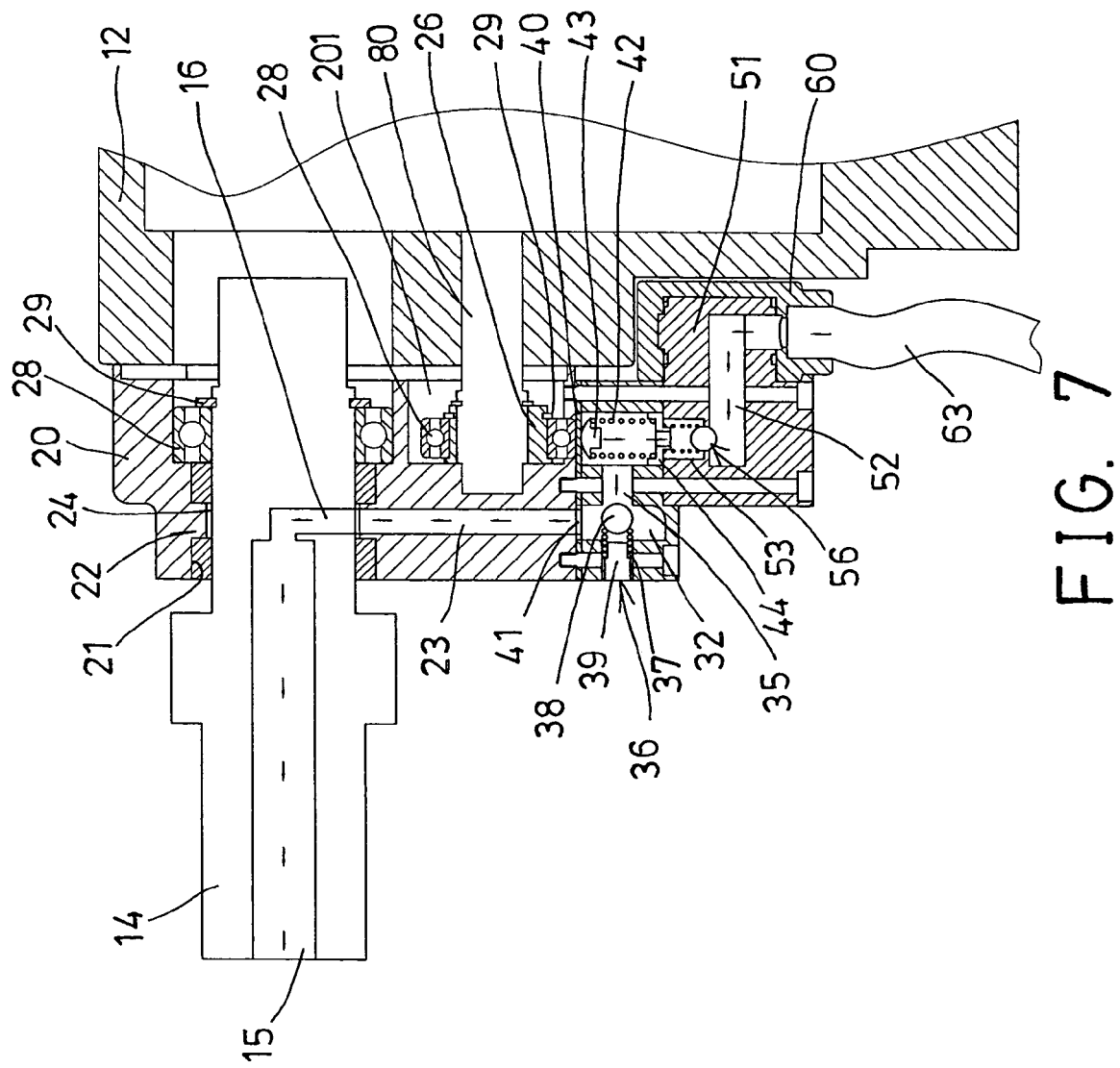

Alternatively, as shown in FIGS. 5–7, an additional spindle 80 may be rotatably engaged in a space 201 of the housing 20, and may also be engaged in the front portion 13 of the support 12, and may also be coupled to the conventional driving device 18, for being rotated or driven by the conventional driving device 18. The eccentric or cam member 26 may be secured onto the spindle 80 and rotated in concert with the spindle 80, and includes the eccentric or cam outer peripheral surface 27 formed thereon.

The bearing 28 may also be optionally or selectively attached or secured onto the eccentric or cam outer peripheral surface 27 of the eccentric member or cam member 26, and may be solidly secured onto the eccentric member or cam member 26 with such as the retaining ring 29. The eccentric or cam outer peripheral surface 27 of the eccentric member or cam member 26 may also be arranged to force the membrane 40, to pump or to draw the water or fluid to flow from the hose 63 and the block 50 into the casing 30 and then to flow into the conduit 23 of the housing 20 and the pathway 15 of the spindle 14.

It is to be noted that the spindle 14 or 80 may be used to engage with and to force the membrane 40 to pump or to draw the water or fluid to flow from the hose 63 and the block 50 into the casing 30 and then to flow into the housing 20 and the spindle 14, such that the water or fluid may be supplied and flown out directly through the pathway 15 of the spindle 14, without additional hoses or water pipes that may be extended or disposed beside the tool members of the typical machines or machine tools, and that may affect the operations of the typical machines or machine tools by the workers.

Accordingly, the machine tool in accordance with the present invention includes a water supplier device disposed or built or provided therein, for supplying water to remove cut chips or to clean the machine tool, without additional or outer or further water supplier device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A machine tool comprising:
    a base including a support disposed thereon,
    a spindle rotatably attached to said support for supporting a tool member thereon, and including a pathway formed therein, and including a port formed therein and communicating with said pathway thereof, and
    fluid supplying means for supplying fluid into said pathway via said port of said spindle, for cooling purposes, said fluid supplying means including a housing secured to said support, and having a bore formed therein for rotatably receiving said spindle, and having a conduit formed therein for selectively aligning with said port of said spindle, and for allowing the fluid from said fluid supplying means to selectively flow into said port of said spindle, and said fluid supplying means including a casing secured to said housing and having a channel and a space formed therein, and said channel of said casing being communicating with said conduit of said housing, and a membrane being secured between said housing and said casing and disposed between said bore of said housing and said space of said casing for pumping the fluid from said space to said channel of said casing.

2. The machine tool as claimed in claim 1, wherein said housing includes an annular swelling extended into said bore thereof, and includes said conduit formed in said annular swelling of said housing.

3. The machine tool as claimed in claim 2, wherein said housing includes a gasket disposed therein and engaged in said annular swelling, and having an opening formed therein and aligned with said conduit of said housing.

4. The machine tool as claimed in claim 1, wherein said casing includes a partition provided therein to separate said space and said channel thereof from each other, and having at least one passage formed in said partition, for communicating said channel and said space thereof with each other.

5. The machine tool as claimed in claim 4, wherein said casing includes a check valve having a spring member for biasing a ball to engage with and to selectively block or open said at least one passage of said casing.

6. The machine tool as claimed in claim 5, wherein said check valve includes a fastener threaded to said casing, for engaging with and for retaining said spring member and said ball within said casing.

7. The machine tool as claimed in claim 1, wherein said membrane includes a passageway formed therein and disposed between said conduit of said housing and said channel of said casing, to allow the fluid to flow form said channel of said casing into said conduit of said housing.

8. The machine tool as claimed in claim 1, wherein said fluid supplying means includes a cam member secured onto said spindle and rotated in concert with said spindle, and having a cam outer peripheral surface formed thereon, for actuating said membrane to pump the fluid.

9. The machine tool as claimed in claim 8, wherein said cam member includes a bearing engaged onto said cam outer peripheral surface thereof, for actuating said membrane to pump the fluid.

10. The machine tool as claimed in claim 8, wherein said fluid supplying means includes a spring member disposed in said space of said casing and engaged with said membrane, for biasing said membrane toward said cam member.

11. The machine tool as claimed in claim 10, wherein said spring member includes a head and a seat attached to two ends thereof respectively, for positioning said spring member.

12. The machine tool as claimed in claim 1, wherein said fluid supplying means includes a block secured to said casing and having a chamber formed therein, and having an outlet and an inlet formed therein and communicating with said chamber thereof, and having a valve seat provided therein, and located between said chamber and said outlet thereof, and a check valve having a spring member engaged with a ball, for biasing said ball to engage with and to selectively block or open said valve seat of said block.

13. The machine tool as claimed in claim 12, wherein said block includes an extension extended therefrom and having said inlet formed therein, and a coupler engaged onto said extension of said block and having a cavity formed therein, for aligning with and for communicating with said inlet of said block, and having a mouth provided therein, for coupling to a fluid reservoir with a hose.

14. The machine tool as claimed in claim 13, wherein said block includes at least one sealing ring engaged between said extension and said coupler.

* * * * *